Oct. 14, 1952  A. F. LINDBERG  2,613,573
MECHANICAL DOWSER FOR MOTION-PICTURE PROJECTING APPARATUS
Filed Nov. 30, 1950
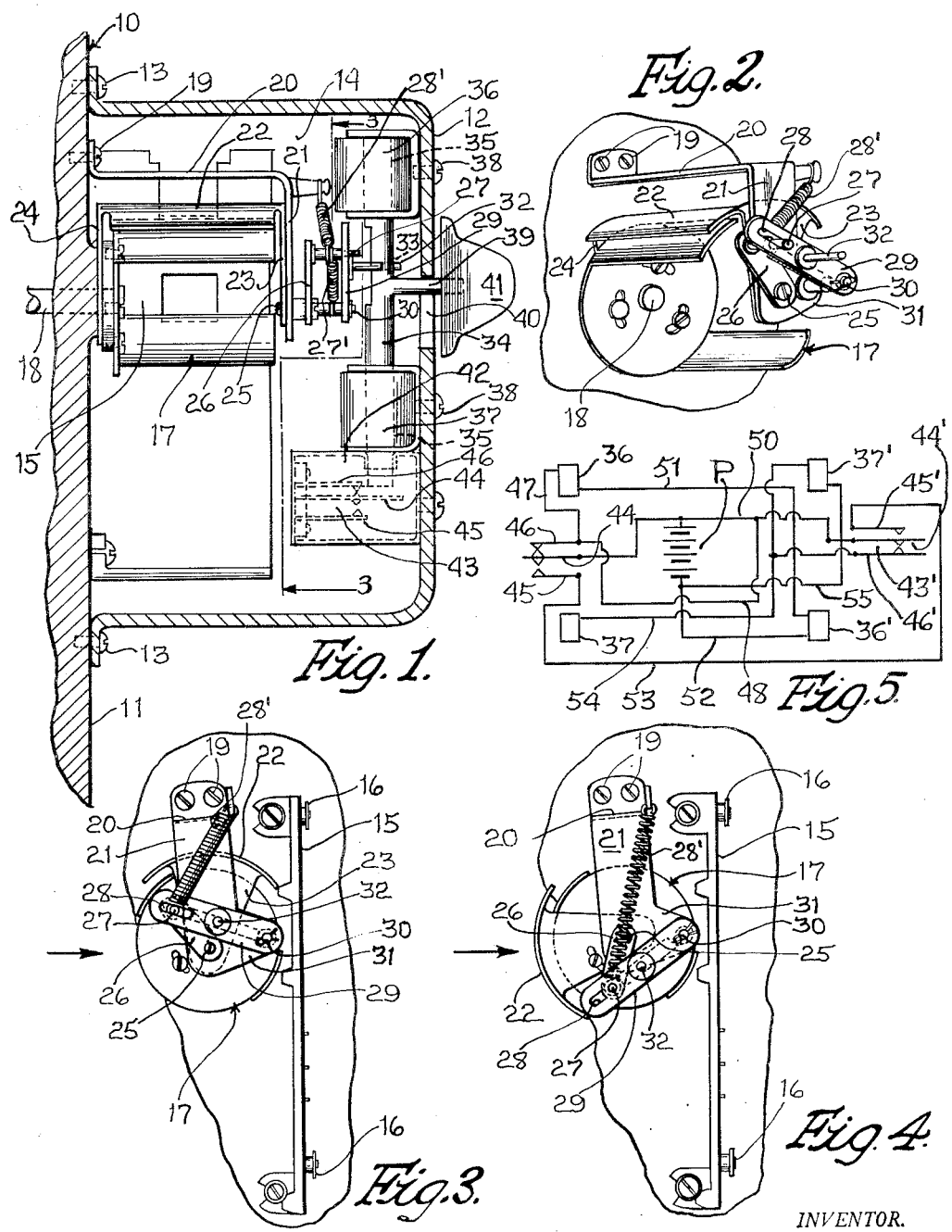
INVENTOR.
Arthur F. Lindberg
BY Clarence E. Threedy
His Attorney Patented Oct. 14, 1952

2,613,573

UNITED STATES PATENT OFFICE 2,613,573

MECHANICAL DOWSER FOR MOTION-PICTURE PROJECTING APPARATUS

Arthur F. Lindberg, Chicago, Ill., assignor to De Vry Corporation, Chicago, Ill., a corporation of Illinois Application November 30, 1950, Serial No. 198,401

1 Claim. (Cl. 88—16)

This invention relates to certain new and useful improvements in mechanical dowsers for motion picture projecting apparatuses for the purposes of shutting or cutting off the light through the film aperture plate of such apparatuses.

The invention is particularly useful where there are employed two motion picture projecting apparatuses alternately employed for picture projecting operation.

A principal object of this invention is to provide a dowser mechanism for the purposes hereinafter stated which is simple in operation and one which will enable the operator to make a quick change-over from one motion picture apparatus to the other without any delay in performance of picture projection.

A still further object of the invention is to provide a device of this character which is simpler in construction and more easy of operation than similar devices now in commercial use.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a fragmentary sectional detail view of a motion picture apparatus showing my invention associated therewith;

Fig. 2 is a perspective view of the dowser mechanism;

Fig. 3 is a fragmentary view taken substantially on line 3—3 of Fig. 1;

Fig. 4 is a view similar to Fig. 3, but showing the parts thereof in different positions; and Fig. 5 is a suggested circuit diagram employed in the invention.

The motion picture apparatus is generally indicated at 10. It comprises a wall 11. To this wall 11 a housing 12 is secured by means of screws 13. A side wall 14 of the housing 12 has a portion thereof removed to provide an opening. Mounted in this opening provided by such removed portion is a film aperture plate 15 of well-known construction and on which is mounted the usual and conventional film gate (not shown). Such gate is usually mounted on such aperture plate 15 through the medium of mounting screws 16. A barrel shutter is indicated at 17 and is mounted for rotation on a driver 18 driven in the usual and conventional manner well-known in the motion picture art. This barrel shutter is located between the condenser lens assembly (not shown) and the apertured plate 15. Secured to the wall 11 as at 19 is an arm 20 having a depending portion 21.

A dowser plate is indicated at 22 and comprises parallelly extending spaced apart arms 23 and 24. The arm 24 has an aperture formed therein through which the shaft 18 projects. The arm 23 has secured thereto a stud shaft 25 by means of which the arm 23 is rotatably connected to the lower end portion of the depending arm 21. By this arrangement, the dowser plate is supported for circumferential movement with respect to the shutter 17. In this connection the dowser plate 22 is adapted to be rotated from the position shown in Fig. 3 to the position shown in Fig. 4 in which position the light passing through the condenser lens assembly is obstructed from passage through the aperture plate 15.

The arrangement for rotating the dowser plate circumferentially with respect to the barrel shutter 17 comprises a link 26 having one end portion mounted for rotation on the stud shaft 25. The opposite end portion of this link 26 carries a laterally extending stud 27 having a reduced portion which extends through an elongated slot 28 formed in an oscillator arm 29. One end of this oscillator arm 29 is mounted on a stud shaft 30 fixed to and carried by an extension 31 provided by the arm 21 at its lower end portion. At a point midway between opposite end portions of the arm 29 there is secured to such arm a laterally extending pin 32. This pin 32 projects through a slot 33 formed in a plunger 34. The ends of this plunger 34 operate in the cores 35 of electromagnetic coils 36 and 37 secured to the housing 12 as at 38. The plunger 34 midway between its opposite end portions provides a stud 39 which projects through a slot 40 formed in the front wall of the housing 12. This stud 39 has a finger button 41 fixed thereto.

The arrangement is such that downward movement of the button 41 from the position shown in Fig. 1 will move the plunger 34 downwardly with the result that the arm 26 will be rocked about the shaft 25 to dispose the dowser plate in light obstructing position as shown in Fig. 4.

Arranged in the housing 12 is a conventional switch box 42 within which is arranged a switch 43 of a well-known standard construction and comprising an intermediate switch leaf 44 on opposite sides of which are arranged switch leaves 45 and 46.

Each motion picture projecting machine embodies a dowser mechanism of a construction just described. The respective switches 43 and 43' of such mechanism are connected with a power source P in the manner suggested by the drawings and which will now be described.

One side of the electromagnetic coil 35 is connected by a conductor 47 to the switch leaf 46 which switch leaf 46 is connected by a conductor 48 to a switch leaf 44' of the switch structure 43'. The intermediate switch leaf 44 is connected by a conductor 50 to the power source P and to the intermediate switch leaf 44' of the switch structure 43'. The opposite side of the coil 36 by a conductor 51 is connected to one side of a coil 36' the other side of such latter coil being connected by a conductor 52 to the power source P. One side of the coil 37 by a conductor 53 is connected to the switch leaf 45 and to the switch leaf 45' of the switch structure 43'. The other side of this coil 37 by a conductor 54 is connected to one side of a coil 37', the other side of such latter coil by a conductor 55 being connected to the power source P. The coils 36 and 37 are a part of the dowser mechanism of one of the motion picture projecting apparatuses while the coils 37' and 36' as well as the switch 43' are a part of the dowser mechanism of the other of the motion picture projecting apparatuses.

The arrangement is such that upon downward movement of the plunger 34 of one of the dowser mechanisms by the manual movement of the button 41 the switch leaf 44 of that mechanism will be brought into engagement with the switch leaf 45. This will set up a circuit from the power source through the switch leaf 44 through the coils 37 and 37' whereby the plunger rod of the coil 37' of the other dowser mechanism will be moved upwardly to pivot the dowser plate 22 thereof from a position such as is shown in Fig. 4 to that shown in Fig. 3, the dowser plate 22 of the first motion picture projecting mechanism being disposed in a position such as is shown in Fig. 4. Upon energization of the coils 36 and 36' the reverse action of the dowser plates takes place. The circuit for the coils is a suggested one and this invention is not to be limited thereto.

To balance the dowser plate 22 I provide counter-acting springs 28' and 27', the spring 28' serving to hold the dowser plate 22 in the position shown in Fig. 3 while the spring 27' serves to counteract the tension of the spring 28' to hold the plate 22 in the position shown in Fig. 4.

While I have disclosed only one of the dowser mechanisms for one of the motion picture apparatuses it is to be understood that the dowser mechanisms of each apparatus are identical in construction.

By the simplified arrangement herein set forth a dowser mechanism is provided which is instantaneous in its operation to obstruct the light from the condenser lens assembly to the apertured plate of the motion picture projecting mechanisms for the purpose herein set forth.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A dowser mechanism for motion picture projecting apparatuses in which there is a rotatable barrel shutter, a dowser plate rotatable circumferentially with respect to the barrel shutter to a position to obstruct light therethrough, means for rotating said dowser plate circumferentially with respect to said shutter, said means including a pair of spaced electromagnetic coils arranged in confronting relation with respect to each other, a plunger common to both coils, said plunger having a slot formed therein, a finger knob, linkage connection between the finger knob and the dowser plate, said linkage connection having a connecting pin engaging the slot of said plunger, switch means actuated by said plunger, and counter-balancing spring means acting on said linkage connection for yieldably holding said dowser plate in either of two positions with respect to said shutter.

ARTHUR F. LINDBERG.

REFERENCES CITED

The following references are of record in the file of this patent:

UNITED STATES PATENTS

| Number | Name | Date |
|---|---|---|
| 1,862,062 | Owens | June 7, 1932 |
| 1,885,631 | Sapier | Nov. 1, 1932 |
| 1,894,769 | Hoffmann | Jan. 17, 1933 |
| 1,958,353 | Stableford | May 8, 1934 |
| 2,106,957 | Nielsen | Feb. 1, 1938 |

FOREIGN PATENTS

| Number | Country | Date |
|---|---|---|
| 196,779 | Great Britain | May 3, 1923 |